No. 618,117. Patented Jan. 24, 1899.
P. R. & N. MILLER.
INTERCHANGEABLE HORSE AND HAND HAY RAKE AND SWEEP.
(Application filed July 28, 1896.)
(No Model.) 3 Sheets—Sheet 1.
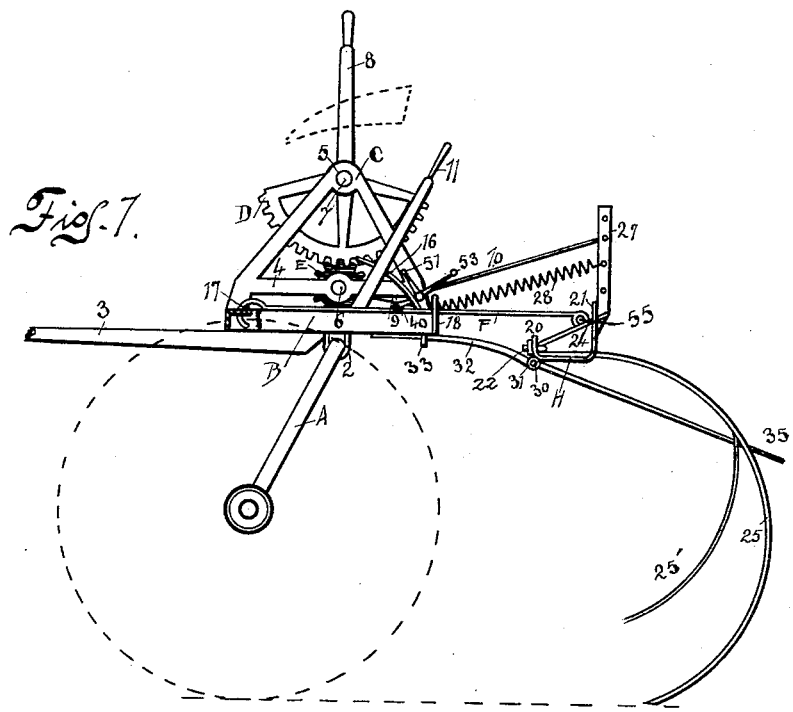
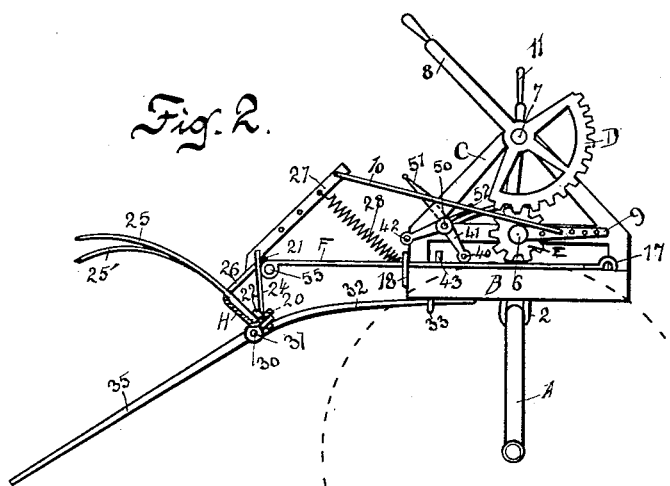
WITNESSES
A. Elkjer
W. A. Webster
INVENTORS
Nathan Miller
Philip R. Miller
BY
ATTORNEY.

No. 618,117. Patented Jan. 24, 1899.
P. R. & N. MILLER.
INTERCHANGEABLE HORSE AND HAND HAY RAKE AND SWEEP.
(Application filed July 28, 1896.)
(No Model.) 3 Sheets—Sheet 2.
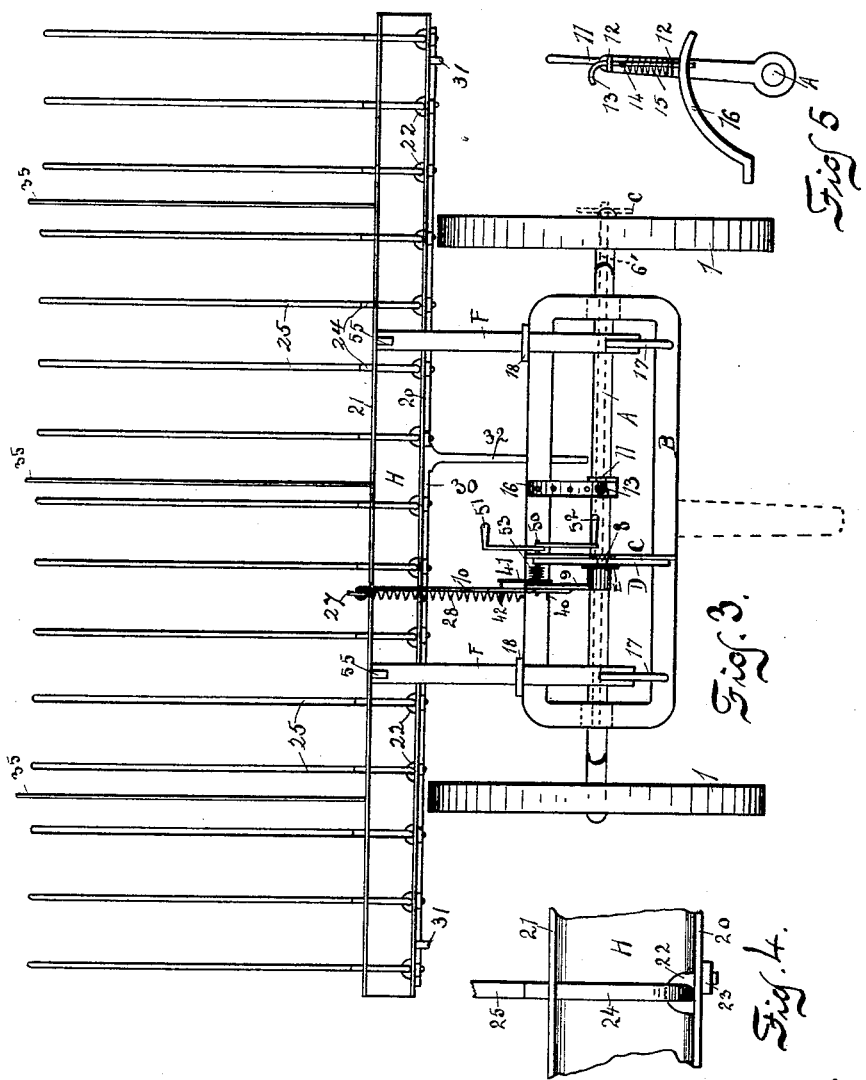

No. 618,117. Patented Jan. 24, 1899.
P. R. & N. MILLER.
INTERCHANGEABLE HORSE AND HAND HAY RAKE AND SWEEP.
(Application filed July 28, 1896.)
(No Model.) 3 Sheets—Sheet 3.
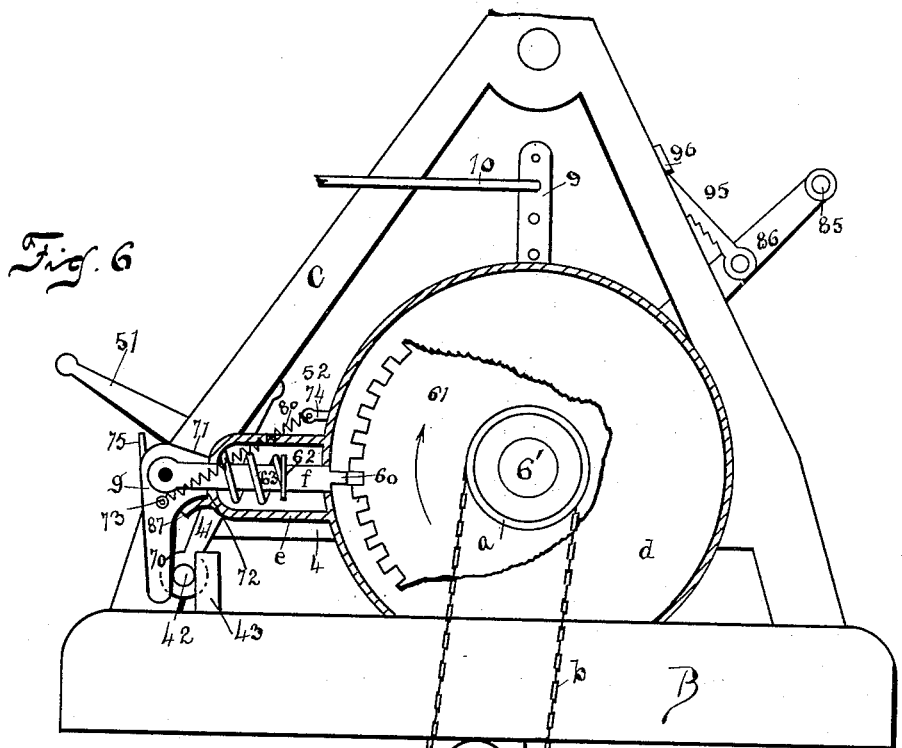
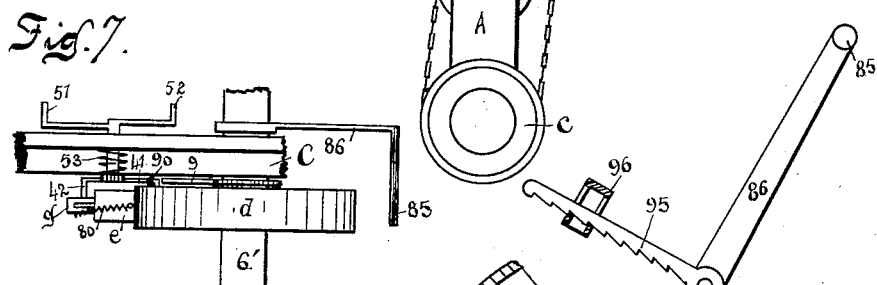
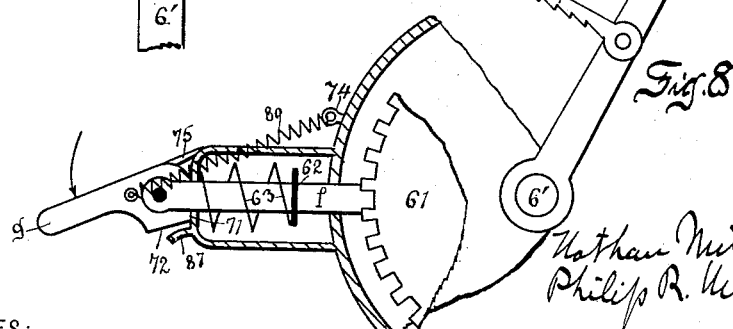
WITNESSES:
INVENTORS
Nathan Miller
Philip R. Miller
BY
ATTORNEY.

UNITED STATES PATENT OFFICE.

PHILIP R. MILLER, OF BEEMER, AND NATHAN MILLER, OF STANTON, NEBRASKA.

INTERCHANGEABLE HORSE AND HAND HAY-RAKE AND SWEEP.

SPECIFICATION forming part of Letters Patent No. 618,117, dated January 24, 1899.

Application filed July 28, 1896. Serial No. 600,839. (No model.)

*To all whom it may concern:*

Be it known that we, PHILIP R. MILLER, residing at Beemer, in the county of Cuming, and NATHAN MILLER, residing at Stanton, in the county of Stanton, Nebraska, have invented certain useful Improvements in Interchangeable Horse and Hand Hay-Rakes and Sweeps; and we do hereby declare that the following is a full, clear, and exact description of the invention, such as will enable others skilled in the art to which it appertains to make and use the same, reference being had to the accompanying drawings, which form a part of this specification.

This invention has relation to a novel interchangeable hand and horse dumping-rake and sweep.

The object of our invention is to provide an interchangeable hay-rake that shall be simple of construction and easily operated, and in which the rake-teeth shall be practically self-balancing, in which the rake-frame can be adjusted in a vertical plane, and in which the rake-teeth can be made to upset promptly and be given short or long action, as desired.

In our invention the weight of the operator is not necessary to throw the rake, and we have further embodied a means whereby the rake can be made to upset easily, as is necessary in ordinary raking, and which can further be adjusted so that the rake will upset less readily and so be adapted to carry a greater load, as would be necessary in raking the windrows into the stack. By this means we provide a rake and sweep combined.

In the accompanying drawings, Figure 1 represents a side elevation, with parts broken away, of our rake and sweep as arranged to operate by hand, embodying our invention and showing the rake in a working position. Fig. 2 shows an end view of our device arranged as a hand-rake, with parts broken away, disclosing a rake as upset. Fig. 3 shows the top view of a rake arranged as hand-dumping, embodying our invention. Fig. 4 shows an enlarged detached broken top view of the tooth-run as employed in our invention. Fig. 5 shows a broken detached view of the locking-lever. Fig. 6 shows an enlarged broken detached view of our rake as provided with the horse dumping mechanism. Fig. 7 shows a top view showing the horse dumping-drum, while Fig. 8 shows a broken detached view disclosing the rack-plate as engaged to operate the plate.

Our invention comprises, essentially, an ordinary crank-axle A, which is provided with the usual axle-spindles and two supporting-wheels 1 1, to which axle is secured a rectangular skeleton supporting-frame B, which frame is provided with the bearings 2, within which the supporting crank-axle A is movably held. Extending from this supporting-frame is a tongue 3, (shown only in Fig. 1,) to which the draft-animals are secured. This supporting-frame is provided at a suitable point with a triangular standard C, which standard is secured to the supporting-frame by any suitable means. This standard is provided with a transverse bar 4, having a central bearing and an upper bearing 5. Within the lower bearing is held a rotating shaft 6, while within the upper is a pin 7, which pin forms part of a tooth-sector D, provided with an operating-handle 8. This sector D meshes low with a pinion E, which pinion is fixed to the shaft 6 and is provided with the extending bar 9, to which bar is adjustably secured a rod 10, the bar 9 being provided with a series of openings, within which the end of the bar 10 is held.

Extending upwardly from the crank-axle A is a lever 11, (shown in detail in Fig. 5,) which lever is provided with the ears 12, within which is movably held a bar 13, provided with a pin 14, against which pin and the lower ear 12 is held an ordinary compressing coil-spring 15, so that this bar 13 is normally drawn downward.

A curved bar 16 is secured to the supporting-frame B and is provided with a series of openings, within which this bar 13 is adapted to work. By this means the crank-axle A can be thrown either forward or backward in relation to the supporting-frame and locked in a desired position. In Fig. 1, for instance, the crank-axle and the connected supported wheels are shown as thrown forward and away from the rake, while in Fig. 2 the axle is shown in a vertical position. Secured to the frame B by means of the bars F F, which bars F are provided at their forward ends with the hooks 17, which hooks work into suitable openings within the frame B. Upon the side opposite we provide two ears 18, through which these bars F work, and to these bars F F in turn is secured the J-shaped rake-head H, which is provided with a forward upwardly-extending stub edge 20 and upon the side opposite with an edge 21, extending a suitable distance above the edge 20. This rake-head is pivotally secured to the bars F. In Fig. 4 we have shown an enlarged broken detail of this rake-head, which is in the shape of an open-ended trough. The edge 20 is provided with a series of openings, through which the J-shaped retaining-bolts 22 are made to pass, which bolts are provided with the nuts 23, which are adapted to engage the V-shaped upper ends of the curved rake-teeth 25, their upper stems 24 being recurved in passing through the slot 26 within the edge 21, as is shown in Fig. 2. By this means the rake-teeth 25 are held in spring tension, so that the stem 24 and tooth 25 are held under spring tension within the slot 26. The rear edge 21 is provided with an upwardly-extending bar 27, which is engaged by the bar 10 as well as by a spring 28, which has a tendency to normally draw the rake into an open or dumping position. The two end rake-teeth are further provided with an additional tine 25' to prevent the hay dragging out of the rake.

In the arrangement of our rake the instrumentalities are so arranged that the rake proper is partially balanced in that the hinge or point of suspension is between the ends of the rake-teeth, the balancing effect further being adjusted by means of the spring 28, so that this rake without a load is self-balancing. At a suitable point below the edge 20 we provide a shaft 30, which shaft is revolubly held within the bearings 31, as is shown in Figs. 1 and 2 and to this shaft in turn is secured a projecting arm 32, (shown in top view in Fig. 3,) which arm works within an eye 33, secured to the under side of the frame B. Extending rearwardly from this shaft are a series of clearing-bars 35, which are normally positioned between the rake-teeth and in such a manner that their pivot-point comes forward of the pivotal or hinged support of the tooth-run, and to the rear of the point at which the forward arm 32 of the clearing-bars is secured to the frame B. This is an important feature in our invention in that as the rake-teeth 25 are thrown upward in dumping a load the ejecting-bars 35, by virtue of their peculiar connection to the rake-head, are carried downward, there being a slight movement of the bar 32 within the eye 33, so that these bars 35 expel the hay within the rake, preventing a choking of the same. This action of the ejecting-bars is automatic and occurs whenever the rake is upset.

In referring to Fig. 3 it will be noticed that the crank-axle supporting the working mechanism of our rake is considerably shorter than the rake proper. This arrangement brings the supporting-wheels in front of the rake and a considerable distance away from the end of the rake. A further advantage in this is that the rake does not follow all the irregular movements of the wheels in passing over rough ground, and it further enables the rake being more easily controlled and handled. The whole rake is further arranged so that the frame B is counterbalanced by the tongue 3, the seat of the driver, which has only been shown in dotted lines in our drawings, being placed centrally above the frame B.

Another noticeable feature of our invention is that the supporting-wheels can be carried away from the rake, so that a large load can be carried within the rake without being brushed out by the wheels. This shifting and adjustable feature of the supporting-wheels is also of advantage in that the wheels can be so positioned that the rake in carrying a full load will nicely counterbalance this load, the use of the duplex end teeth preventing the rake from dragging the hay.

To bring the action of the rake under the control of the operator, we provide the tooth-sector D, as described, with the operating-handle 8, so that any movement imparted to the sector transmits a rotary motion to the pinion E, which, as described, is provided with the arm 9, connected by means of the bar 10 to the rake proper by means of the bar 27. As this pinion E is made very small and the sector D quite large the rake is easily under the control of the operator and acts almost instantly in dumping.

Another noticeable feature of our invention lies in the fact that by means of the bar 10, which can be adjustably secured to either of the bars 9 or 27, the rake can be given a very high sweep, which is of advantage whenever the device is used as a sweep in collecting or depositing the windrows into a stack.

Referring now to Figs. 1 and 2, it will be noticed that while the rake is in a closed or working position the bar 9 rests below and upon a pin 40, which pin is secured to a bell-crank 41, a second arm of which is provided with a pin 42, these two pins working between a stop 43, forming part of the frame B, as is shown in Fig. 2.

Referring now to Fig. 3, it will be noticed that this bell-crank 41 is secured to a shaft 50, which is provided upon the end opposite with the operating-handles 51 and 52, a spring 53 further being positioned upon this shaft 50 to normally force the pins 40 and 42 downward, so that the pin 40 lies immediately below the bar 9 when in a closed or working position. Now whenever it is desired to upset the rake the operator simply grasps one of the handles 51 or 52 and throws the same backward, which movement carries upward the pin 40, which rests below the bar 9, and as this bar 9 is carried upwardly the weight of the load within the rake will have a tendency to throw the bar 9 forward to dump.

It should be remembered that the rake is normally held in a locked position and can only be set in motion either by means of the operating-handle 8 or in giving the bar 9 a start. This bar resting below the horizontal and upon the pin 43 is thereby held in a normally-locked position.

The handle 8, by virtue of the sector D, can be given nice adjustment in relation to the rake proper. As shown in Fig. 1, the handle is in a perfectly vertical position, but by drawing out the sector D from engagement with the pinion E the handle 8 can be given any suitable angle and the sector D reëngaged with the pinion E while the rake is locked. By this means the operator can have the handle in front of him, at the side or at the rear, so that he can arrange the position of this lever to suit his own convenience. A boy with a short reach would place the handle nearer to him than a man with a long reach.

Another important feature is that in going over windrows or when raking into the stack the frame B can be raised and lowered as to its position in relation to the wheels in that the wheels can be instantly thrown forward by means of the handle 11.

As has been described, the shaft 50, in connection with the spring 53 and the handles 51 and 52, forms a trip, by means of which the rake is thrown out of its locked position and can be actuated either by hand or foot. The spring 53 is arranged to normally force the pin 40 in a downward position. By means of the arm 9 also a long or short sweep may be imparted to the rake in dumping, and the dump, it should be remarked, is high, and the hay further is a considerable distance to the rear of and never comes in contact with the feet of the draft-animals.

Another point involved is that by virtue of having the supporting running-gear of a length considerably less than the rake proper the rise or fall of the running-gear is not imparted to the rake in that the rake extends beyond the ends of the running-gear and is not immediately affected, a slight movement of the rake being allowed by virtue of the bars F, which are allowed an upward movement within the supporting-ears 18, and which bars, if desired, can be made of spring material, so that they would be yieldingly and at the same time pivotally and movably secured to the supporting-frame, which, as has been stated, is again movably and adjustably secured to the running-gear. We are enabled by this mechanism to deposit high narrow windrows by virtue of the rake-teeth being long and positioned high, so that in actuating the sweep backward and instantly loose the load rather than upward, as is the case should the teeth be short and work in a small arch. By virtue of the adjusting lever or handle 11 the rake can further be made to run heavy or light over the ground in that the teeth can be held above or be made to drag upon the ground.

As described so far, our invention relates to the hand-dump. Often, however, it is desired to have what is known as a "horse-dump," in which instance the rake is upset directly by the action of the vehicle. To accomplish this, we provide our invention, whenever desired, with a horse-dump comprising a shaft 6', which at one end extends over and beyond the edge of the wheel, as is shown in Fig. 3, and at the end we provide this shaft with a chain-gear $a$, adapted to receive a chain $b$, which chain in turn works over a chain-pulley $c$, secured to one of the supporting-wheels, as is shown in dotted lines in Fig. 3. By this means the shaft 6' is continuously rotated while the apparatus is used. To the shaft 6' we next attach a dumping-drum $d$, which is provided with an extension $e$, within which works a bar $f$, having a projection 60, which is adapted to work within a rack-plate 61, which plate is secured to the shaft 6'. The bar $f$ is provided with a collar 62, against which an expanding coil-spring 63 works, which at its forward end rests against the extension $e$. The forward end of the bar $f$ is provided with a head $g$, pivoted to the bar $f$, having an extending nosing 70 below, and a riding surface 71 and 72. A spring 73 is further secured to this head $g$, and a projection 74, forming part of the dumping-drum, a stop-pin 75 further forming part of this head. This dumping-drum, it should be stated, is secured to the machine in lieu of the sector D and pinion E, occupying the position of the last named. In this arrangement the head $g$ is held in such a way that the bar $f$ is disengaged from the disk 61, during which time the rake is supposed to be filling with hay. As soon as the desired quantity has been collected the operator upsets the trip previously described, either by hand or foot, which carries forward the pin 42 of the bell-crank 41, so that the nosing 70 is carried outward, being aided in this by means of the coil-spring 80. As soon as this nosing moves the spring 63 also has a tendency to force the bar $f$ outward until the head $g$ rides upon the second base 71, during which time the extension 60 will be locked into one of the serrations of the disk 61. As soon as that occurred the rake would be actuated to dump by virtue of the rotary movement which was now imparted to the dumping-drum, to which, in this instance, the bar 9 would be connected to carry the rod 10 forward in dumping the rake. In this position the nosing would be held outward, as is shown in Fig. 8, and the rake would of course be carried upward as long as the bar $f$ were engaged within the disk 61. To promptly disengage this bar $f$, referring now to Fig. 8, we provide an adjustable striker-bar 85, forming part of the lever 86, secured to and loosely mounted upon the shaft 6'. As the head g swept forward it would finally engage the striker-bar 85 and be upset, so that the base 72 would again come into play, by which movement of course the bar f would be disengaged, when the weight of the rake would promptly carry the dumping-drum into its first and original position, as disclosed in Fig. 6, so that the rake would again be in position to gather a load.

The strain of the rake in gathering a load is against the bar 9, which is secured to the dumping-drum d, which drum is provided with a pin 90, referring to Fig. 7, which rides against the bell-crank 41, by which it is held. The striker-bar 85 can be positioned so as to make a short or long sweep of the rake by means of the rack-bar 95, working through a holder 96, as is shown in Fig. 8, the holder 96 being secured to the standard C. In this arrangement it will be noticed that the driver or operator of the rake need simply actuate the trip, which he most likely would do by foot, to dump the rake, which automatically assumes its first position to gather a subsequent load, which at the desired time is dumped as described.

Now, having thus set forth the advantages of our invention and described the same, what we claim as new, and desire to secure by United States Letters Patent, is—

1. The combination with a supporting-frame, of a crank-axle movably secured to said frame, an operating-bar to shift said crank-axle, a rake-head projecting beyond said frame, and supporting-bars securing said head and frame, said bars and connected head being permitted movement in a vertical plane in respect to said frame.

2. The combination of a wheel-supported frame, of arms movably connected to said frame, an approximately J-shaped rake-head, said rake-head being hinged at its largest side to said arms, slots within said largest side, the shorter edge of said rake-head being positioned nearest said supporting-frame, and a plurality of rake-teeth having V-shaped terminations, said teeth being removably secured at their terminations to the shorter side of said J-shaped rake-head, said double-tooth terminations working within said slots.

3. A rake-head, said rake-head being J-shaped in cross-section, so as to have a bottom and a long and short side, slots within the longer side, curved rake-teeth provided at their upper terminations with a recurved stem extending in the same plane with its tooth, said slots being adapted to accommodate the recurved ends of said teeth, and means to secure said teeth at their recurved end to the shorter side of said rake-head.

4. The combination with a supporting-frame of a rake-head extending laterally beyond said frame, said head being J-shaped in cross-section, arms movably secured to said supporting-frame, said arms being permitted movement in a vertical plane, and further being movably secured at their remaining ends to said rake-head at a point between the ends of said rake-teeth.

5. The combination with a supporting-frame, of a rake-head pivotally secured at the upper edge farthest from said frame to said frame, of clearing-bars pivotally secured to said rake-head at the lower edge nearest to said frame and a projecting bar extending from said clearing-bars to engage said frame, said instrumentalities being so arranged that as said rake-head is tilted in carrying the rake-teeth upward, said clearing-bars are automatically carried downward.

6. In a rake-head-locking mechanism, the combination with a supporting-frame, of a pinion working within said frame, an arm extending from said pinion, a controlling-quadrant meshing with said pinion, a rake-head movably secured to said frame, a bar connecting said rake-head to said arm, and an adjustable stop controlling the movement of said arm in one direction, the union of said bar and arm falling below a plane passing through the center of said pinion, and the point of union of said bar to said rake-head, when said head is locked in a working position.

7. The combination with a wheeled supporting-frame, a shaft extending transversely across said frame, said shaft being in belt connection with one of said wheels, a drum loosely journaled upon said shaft, a rack-disk working within said drum and fixed to said shaft, a spring-actuated bar secured to said drum, said bar being adapted to work within said rack-disk, a head provided with two riding-surfaces secured to said spring-actuated bar, said head being so arranged that in one position said bar rides free of said rack-disk, while in the second position said bar is permitted to engage said rack-disk, said head and bar normally being disengaged, and a trip to upset said head to engage said rack-disk.

8. The combination with a wheeled supporting-frame, a shaft extending transversely across said frame, said shaft being in belt connection with one of said wheels, a drum loosely journaled upon said shaft, a rack-disk working within said drum and fixed to said shaft, a spring-actuated bar secured to said drum, said bar being adapted to work within said rack-disk, a head provided with two riding-surfaces secured to said spring-actuated bar, said head being so arranged that in one position said bar rides free of said rack-disk, while in the second position said bar is permitted to engage said rack-disk, said head and bar normally being disengaged, a trip to upset said head to engage said rack-disk, and an adjustable striker to carry said head into its normal position.

9. The combination with a wheeled rake-frame, of a shaft secured to said frame, belt connection between one of said wheels and shaft, the drum, $d$, journaled on said shaft, the rack 61, secured to said shaft, the sliding spring-bar, $f$, working within said drum, the double-surfaced head, $g$, secured to said bar $f$, and the trip 41, provided with the pin 42, to actuate said double-surfaced head, substantially as and for the purpose set forth.

In testimony whereof we affix our signatures in presence of two witnesses.

PHILIP R. MILLER.
NATHAN MILLER.

Witnesses to Philip R. Miller:
E. F. BLUMER,
WM. BARGE.

Witnesses to Nathan Miller:
FRED SIDLER,
WILLIAM BEESWICK.